United States Patent
Carter et al.

(10) Patent No.: US 10,761,534 B2
(45) Date of Patent: Sep. 1, 2020

(54) FUSED SENSOR VIEW FOR SELF-DRIVING TRUCK

(71) Applicant: UATC, LLC, San Francisco, CA (US)

(72) Inventors: Michael Carter, San Francisco, CA (US); Soren Juelsgaard, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 250 days.

(21) Appl. No.: 15/883,941

(22) Filed: Jan. 30, 2018

(65) Prior Publication Data

US 2019/0235504 A1    Aug. 1, 2019

(51) Int. Cl.
```
G05D 1/02     (2020.01)
G05D 1/00     (2006.01)
G06T 7/70     (2017.01)
```

(52) U.S. Cl.
CPC ......... *G05D 1/0212* (2013.01); *G05D 1/0088* (2013.01); *G05D 1/0231* (2013.01); *G05D 1/0257* (2013.01); *G06T 7/70* (2017.01); *G05D 2201/0213* (2013.01); *G06T 2207/30252* (2013.01)

(58) Field of Classification Search
CPC .. G05D 1/0212; G05D 1/0257; G05D 1/0231; G05D 1/0088; G05D 2201/0213; G06T 7/70; G06T 2207/30252; G06T 7/73; G06T 2207/20221; G06T 2207/10028; G06T 2207/10024
USPC .......................................................... 701/23
See application file for complete search history.

(56) References Cited

U.S. PATENT DOCUMENTS 9,211,889 B1 *  12/2015  Hoetzer ................ B60Q 5/006
2019/0256061 A1 *  8/2019  Nemeth .................... B60T 7/12

* cited by examiner

*Primary Examiner* — Maceeh Anwari
(74) *Attorney, Agent, or Firm* — Dority & Manning, PA (57) ABSTRACT

An autonomous control system of a self-driving semi-truck can monitor a dynamic orientation of a cargo trailer in relation to a tractor of the semi-trailer truck. Based on the dynamic orientation of the cargo trailer, the control system can dynamically generate a coordinate transform between a first reference frame of a first set of sensors mounted to the tractor, and a second reference frame of a second set of sensors mounted to the cargo trailer, and execute the dynamically generated coordinate transform on sensor data from the second set of sensors to generate a fused sensor view of a surrounding environment of the self-driving semi-truck.

20 Claims, 10 Drawing Sheets

FUSED SENSOR VIEW FOR SELF-DRIVING TRUCK

BACKGROUND

Semi-trucks ("trucks") refer to a type of freight vehicle, having a front vehicle (sometimes referred to a "tractor" or "tractor truck") that can attach and transport a trailer (a "semi-trailer," "freight trailer," or "cargo trailer"). Semi-trucks, in general, pose numerous challenges with respect to their drivability given the size, geometry, and weight. For this reason, truck drivers are often required to earn separate credentials in order to operate a semi-truck.

The Mansfield bar of a cargo trailer—also known as an Interstate Commerce Commission (ICC) bar, underride guard, or rear impact guard—is a safety bumper that prevents vehicles from under-riding the cargo trailer from the rear, which can result in passenger compartment intrusion and gruesome injuries and fatalities. The Mansfield bar's namesake is the deceased actress, Jayne Mansfield, who was killed in a vehicle collision with an unprotected rear of a cargo trailer, causing the National Highway Traffic Safety Administration (NHTSA) to mandate the installation of Mansfield bars on all trailers and semi-trailers.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Autonomous vehicle control requires a sensor view of the vehicle's surroundings so that an on-board autonomous control system can perform object detection, tracking, and motion planning operations. Semi-trucks include a tractor with a cabin and a fifth wheel upon which the kingpin of a trailer is coupled. Due to the dimensions and configuration of the semi-trailer truck, significant blind spots exist for human drivers. These blind spots are mitigated through the use of large mirrors, and more recently, blind spot cameras. A key advantage of autonomous systems is the placement of sensors to create a fully or near-fully encompassed sensor view of the truck's surrounding environment.

Examples described herein include a semi-truck that can be autonomously driven while attached to a cargo trailer. In some examples, a semi-truck is provided having a configuration of sensors to acquire a real-time, fused sensor view for enabling autonomous operation of the semi-truck. In particular, examples provide for a semi-truck to include a configuration of sensors that enables the truck to autonomously operate to respond to obstacles on the roadway, change lanes in various traffic and/or weather conditions, merge onto highways, exit off of highways, and the like. Such sensors can comprise a set of LIDAR sensors, cameras, radar sensors, and the like. In various examples, reference is made to a "high definition" (HD) LIDAR sensor versus a "low definition" (LD) LIDAR sensor. As used herein, HD is a relative term referring to LIDAR sensors having more than thirty channels, such as a sixty-four channel LIDAR sensor (e.g., an HDL-64 LIDAR sensor manufactured by VELODYNE LIDAR). LD refers to LIDAR sensors having less than thirty channels, such as a sixteen channel PUCK™ LIDAR sensor manufactured by VELODYNE LIDAR.

The autonomous semi-truck can include a tractor that includes a drive system (e.g., comprising acceleration, braking, and steering mechanisms), a configuration of sensors, and an autonomous control system that receive sensor inputs from each sensor of the configuration, and provides control inputs to the drive system to autonomously operate the vehicle. The configuration of sensors can include a first set of sensors mounted to the tractor that encompasses fields of corresponding to regions in front of the truck, and extending rearward from the sides of the truck. For example, the first set of sensors can comprise at least one roof-mount HD LIDAR sensor, a set of cameras, and or a set of radar sensors. In various aspects, a sensor assembly comprising multiple sensor types (e.g., a camera, an LD LIDAR sensor, and/or a radar sensor) can be mounted on or near the door mirrors or hood mirrors of the tractor, and can be rearward facing to provide sensor data coverage of the sides of the tractor and coupled trailer.

According to examples described herein, the semi-truck can further include a second set of sensors mounted to an intermediate mounting component that secures the second set of sensors to the Mansfield bar of the trailer. These rearward facing sensors can provide sensor data encompassing the critical field of view directly behind the trailer. The intermediate mounting component can include a first set of securing features that mount to the Mansfield bar and a second set of securing features upon which to mount the second set of sensors. As described herein, the second set of sensors can comprise a combination of radar sensors, cameras, and/or LIDAR sensors. In example configurations, the intermediate mounting component can include a pair of radar sensors mounted to be positioned at opposing ends of the Mansfield bar. Additionally or alternatively, the intermediate mounting component can include a set of cameras and/or a LIDAR sensor (e.g., an LD LIDAR sensor) mounted thereon.

According to various examples, the autonomous control system of the semi-truck can receive sensor data from the first and second sets of sensors to dynamically generate a fused, live sensor view of the entire surrounding environment of the truck. It is contemplated that because the respective motions of the tractor and trailer comprise separate but dependent reference frames, the control system can dynamically execute coordinate transformation instructions on sensor data from the second set of sensors to generate the live sensor view. In doing so, the control system can account for the sensor data from the second set of sensors being in a different global coordinate system than the first set of sensors.

In executing the coordinate transformation, the control system can dynamically monitor an orientation of the trailer (e.g., a trailer angle) in relation to the tractor. This monitoring can be performed via image data from one or more rearward facing cameras mounted to the tractor. In variations, an encoder (e.g., one or more linear or rotary encoders) can be installed within the fifth wheel of the tractor or mounted to the kingpin of the trailer. The monitoring of the trailer orientation can be based on data from the encoder(s). In variations, other sensor systems may be utilized to dynamically monitor the orientation of the trailer, such as GPS systems, inertial measurement unit (IMU) sensors, additional cameras, LIDAR sensors, radar, time-of-flight cameras, ultrasonic sensors, and the like. Based on the trailer orientation, the control system can dynamically generate a coordinate transform that accounts for the real-time reference frame difference between the tractor and trailer, and execute the coordinate transform on sensor data from the trailer-mounted sensors to generate the live sensor view and autonomously operate the semi-truck along a current route. Additionally, state estimation techniques may be executed based on the sensor data to determine the trailer orientation and/or the coordinate transform. Such state estimation techniques can comprise execution of state estimation algorithms, such as Kalman filters (e.g., an Extended Kalman Filter and/or Unscented Kalman Filter), and the like.

As used herein, a computing device refers to devices corresponding to desktop computers, cellular devices or smartphones, laptop computers, tablet devices, virtual reality (VR) and/or augmented reality (AR) devices, wearable computing devices, computer stacks (e.g., comprising processors and field-programmable gate arrays (FPGAs)), etc., that can provide network connectivity and processing resources for communicating over a network. A computing device can also correspond to custom hardware, in-vehicle devices, or on-board computers, etc.

One or more examples described herein provide that methods, techniques, and actions performed by a computing device are performed programmatically, or as a computer-implemented method. Programmatically, as used herein, means through the execution of software, code, and/or computer-executable instructions. These instructions can be stored in one or more memory resources of the computing device. A programmatically performed step may or may not be automatic. An action being performed automatically, as used herein, means the action is performed without necessarily requiring human intervention.

One or more examples described herein can be implemented using programmatic modules, engines, or components. A programmatic module, engine, or component can include a program, a sub-routine, a portion of a program, and/or a software component and/or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, smartphones, tablet computers, laptop computers, and/or network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Logical machines, engines, and modules shown or described with figures below may be executed by processing resources and computer-readable mediums on which instructions for implementing examples disclosed herein can be carried and/or executed. In particular, the numerous machines shown with examples of the disclosure include processors, FPGAs, application specified integrated circuits (ASICs), and/or various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Self-Driving Semi-Truck Fields of View

Figure 1:
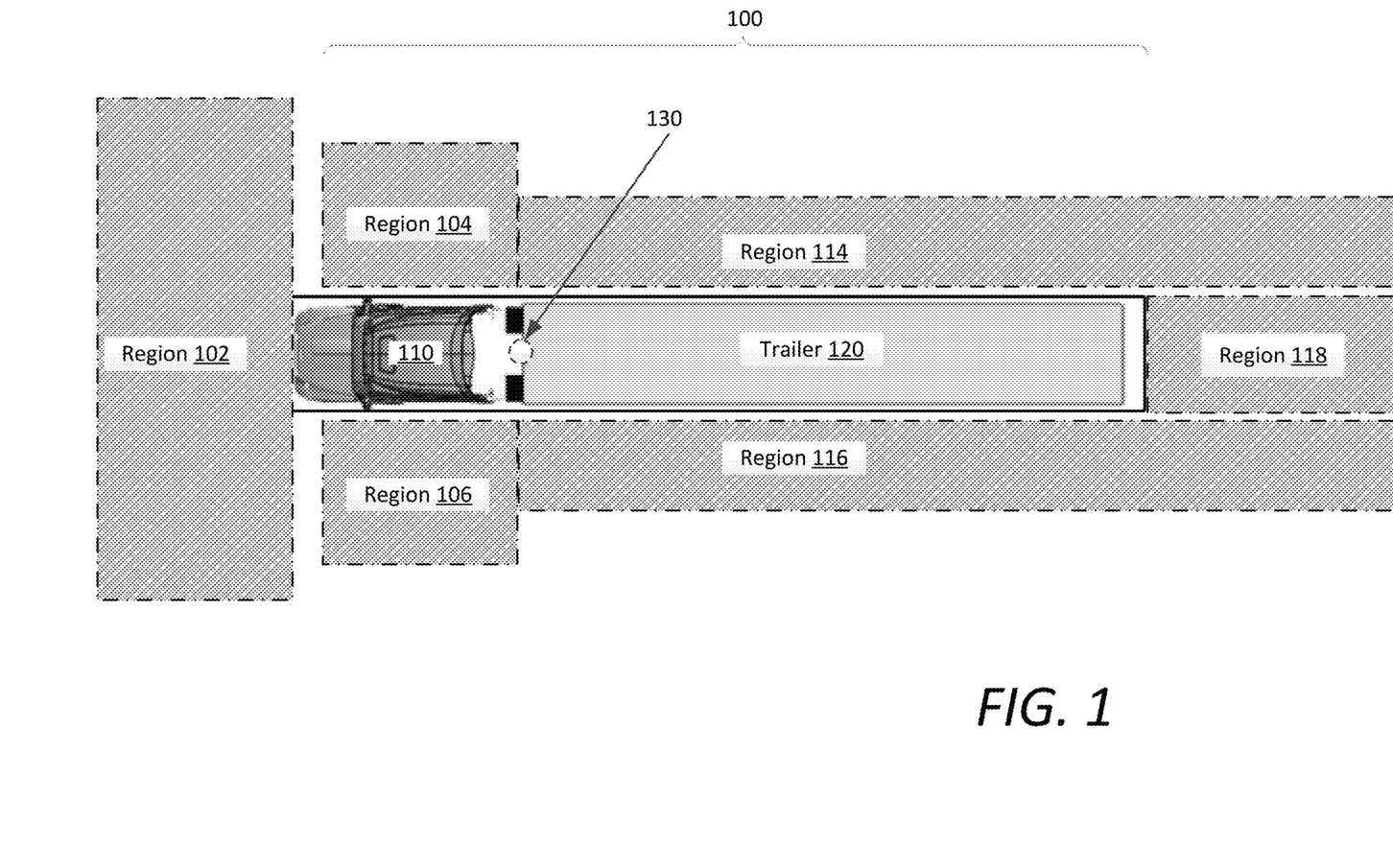
FIG. 1 illustrates fields of view for a self-driving semi-truck using an example sensor configuration, as described with various examples.

FIG. 1 illustrates fields of view for a self-driving semi-truck using an example sensor configuration, as described with various examples. The autonomous semi-truck 100 can include a tractor 110, a fifth wheel coupling 130, and a trailer 120 with a kingpin mounted to the fifth wheel coupling 130. In examples, the truck 100 includes a sensor configuration that accommodates multiple regions about each of the tractor 110 and the trailer 120. As described with various examples, the autonomous semi-truck 100 may include one or more active range sensors (e.g., LIDAR and or radar sensors) having a field-of view that encompasses a forward region 102. Additionally, other sensors can be used that have fields of view that encompass side regions 104, 106, extending from lateral sides of the tractor 110. Additionally, the trailer side regions 114, 116 may be encompassed by sensors mounted to the tractor 110. For example, rearward facing sensor assemblies comprising radar sensors, cameras, and/or LIDAR sensors can be mounted to the door mirrors of the tractor 110 and can provide sensor data encompassing regions 114 and 116.

An ever-present blind spot for human drivers and tractor-mounted sensors of trucks is region 118 directly behind the trailer 120. Examples described herein provide for a sensor mounting kit or sensor array kit mountable on the Mansfield bar of the trailer 120 to prove sensor data coverage for this critical region 118. The inclusion of sensor data coverage of region 118 can enable the autonomous control system of the semi-truck 100 to make operative decisions more safely, particularly with regards to maneuvers and driving actions involving high speed differentials (e.g., merging onto a freeway), lane changes, and docking procedures.

Example Self-Driving Semi-Trailer Truck

Figure 2A:
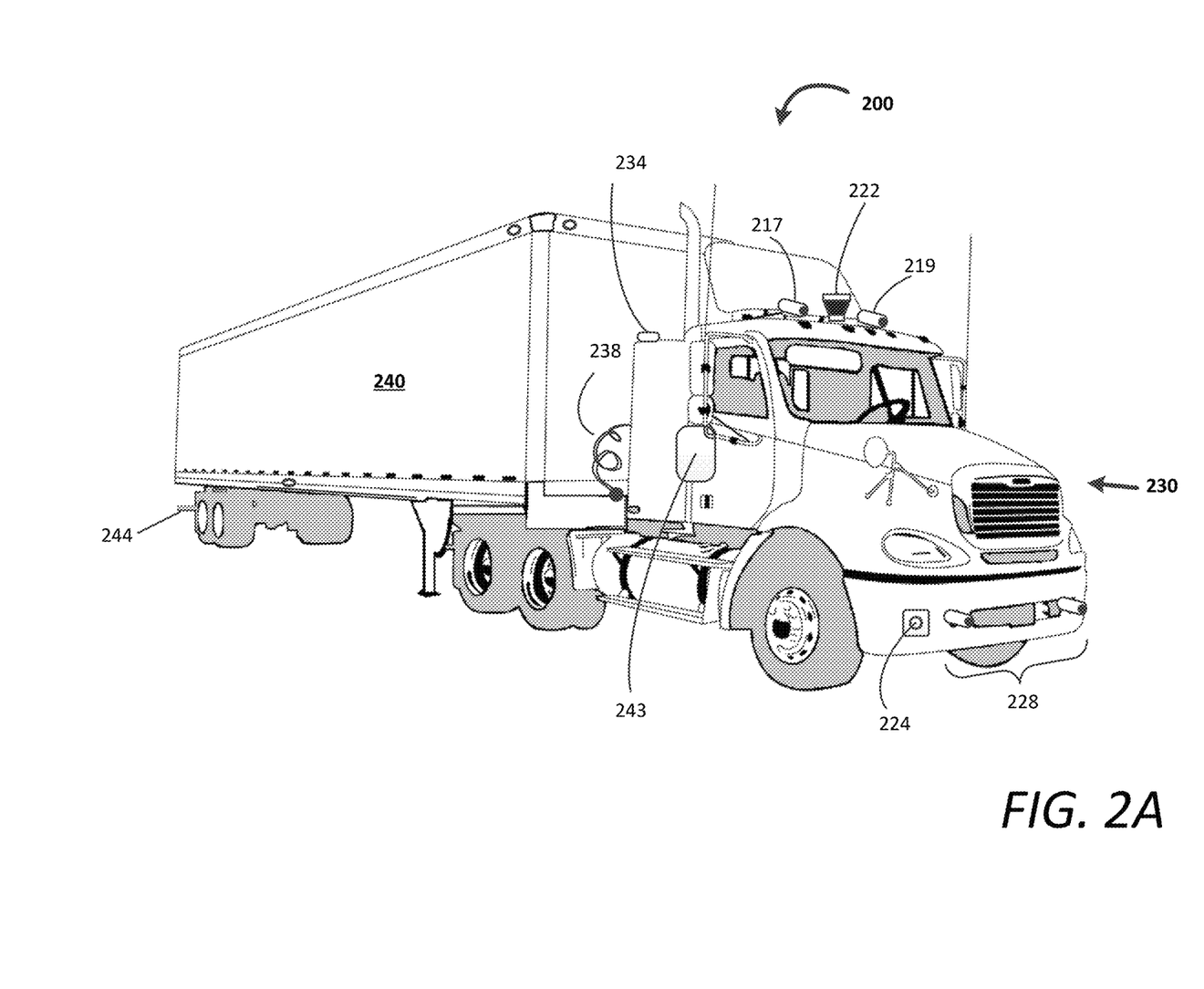
FIG. 2A illustrates a self-driving semi-trailer truck including a self-driving tractor coupled to a cargo trailer, according to examples described herein.

FIG. 2A illustrates a self-driving semi-trailer truck 200 including a self-driving tractor 230 coupled to a cargo trailer 240, according to examples described herein. As shown in FIG. 2A, the self-driving semi-trailer truck 200 can include a self-driving tractor 230 with a cargo trailer 240 having a kingpin coupled to a fifth wheel or trailer hitch of the self-driving tractor 230. The self-driving tractor 230 includes a set of sensors, such as a rooftop high definition LIDAR sensor 222, a set of cameras 217, 219, 228, and one or more radar sensors 224. In certain aspects, the tractor 230 can also include a rearward facing sensor assembly 243 that can include one or more radar sensors, cameras, and/or LIDAR sensors (e.g., a low-definition LIDAR sensor) to detect objects within regions 104, 106, 114, and 116 shown in FIG. 1. For example, the tractor 230 can include a left sensor assembly mounted to the left-side mirror of the tractor 230 and a right-side sensor assembly 243 mounted to the right-side mirror of the tractor 230.

In certain implementations, the sensors mounted to the tractor 230 can further include one or more rearward facing cameras 234. In certain aspects, the rearward facing camera(s) 234 can be utilized to provide sensor data encompassing the rear of the tractor 230 when a cargo trailer 240 is not hitched to the fifth wheel of the tractor 230. Additionally or alternatively, the rearward facing camera(s) 234 can provide sensor data of the forward surface and edges of the cargo trailer 240, which can be utilized the control system to dynamically determine the angle or orientation of the trailer 240 with respect to the tractor 230, as discussed below.

The various sensors mounted or otherwise included with the tractor can provide an autonomous control system of the self-driving tractor 230 with a sensor view of a surrounding environment of the tractor 230 to enable the control system to autonomously operate the control mechanisms of the self-driving tractor 230, as described in detail below in connection with FIG. 3. In examples, described herein, the sensor view can include region 118 of FIG. 1, corresponding to sensor data received via a sensor configuration mounted to a Mansfield bar 244 of the trailer 240. In various examples, the sensors coupled to the Mansfield bar 244 can transmit sensor data wirelessly (e.g., via BLUETOOTH, Wi-Fi, Zigbee, Infrared, etc.), or through a wired interface via the trailer bus connection 238. The trailer bus connection 238 can electronically couple the self-driving tractor 230 to the cargo trailer 240 to, for example, selectively provide power to the various lighting elements of the cargo trailer 240, such as the tail lights, brake lights, turning signals, reverse lights, clearance lights, and the like.

According to various examples, the sensors coupled to the Mansfield bar 244 can receive power over the trailer bus connection 238 from the tractor 230. In certain implementations, the sensors coupled to the Mansfield bar 244 can also transmit or stream sensor data via the trailer bus connection 238. In such examples, the connector for the trailer bus connection 238 can comprise a multi-pin connector with a data pin for transmitting the sensor data from the sensors coupled to the Mansfield bar 244 to the autonomous control system of the self-driving tractor 230. In one example, the sensors coupled to the Mansfield bar 244 can include an interface that connects the sensors to the existing wiring of the trailer 240.

Example Trailer

Figure 2B:
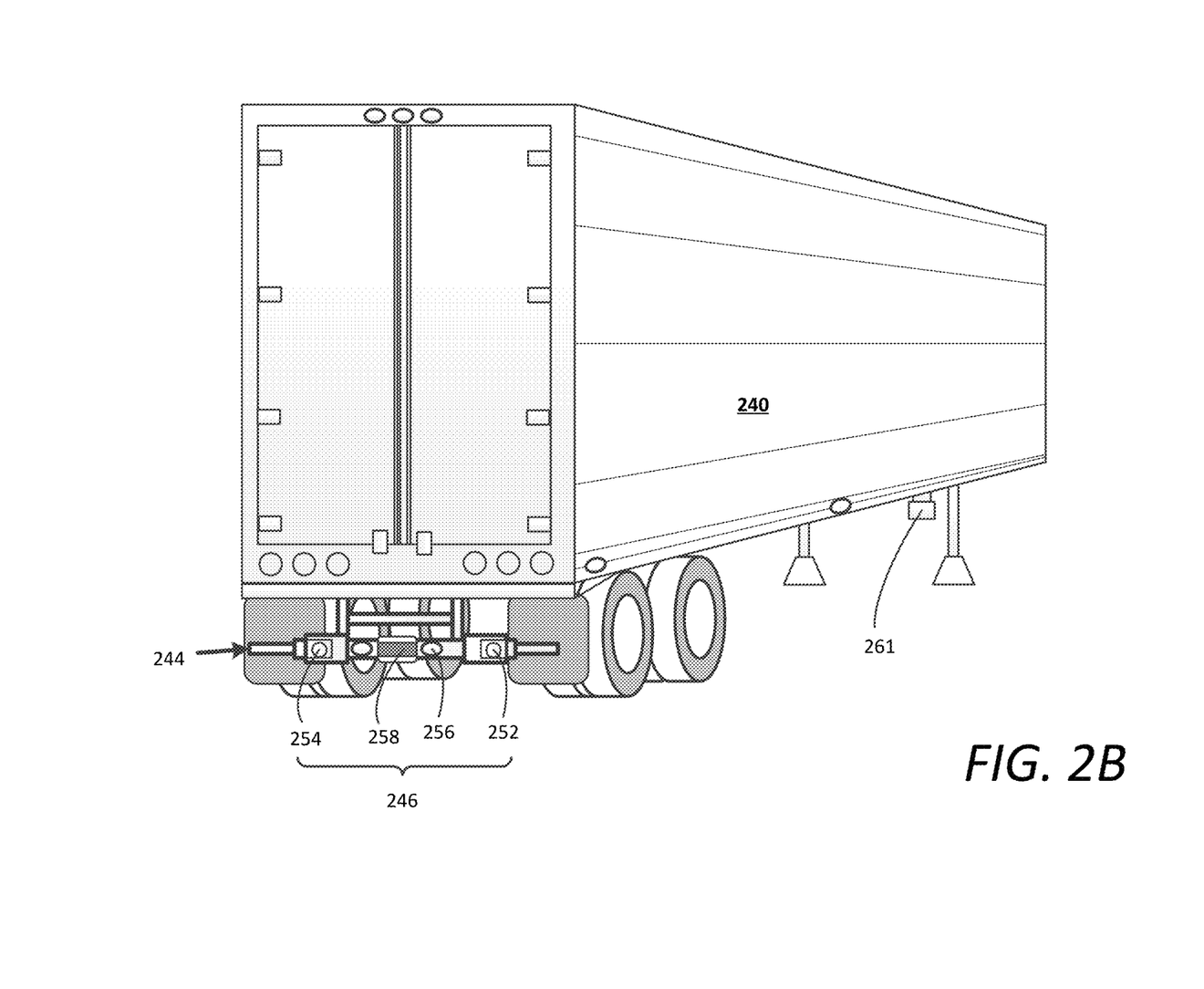
FIG. 2B illustrates a cargo trailer including a sensor set mounted to the Mansfield bar of the trailer, according to various embodiments.

FIG. 2B illustrates a cargo trailer 240 including a sensor set mounted to the Mansfield bar of the trailer, according to various embodiments. The cargo trailer 240 can include a kingpin 261 that couples the cargo trailer 240 to the fifth wheel of a tractor 230. In various examples, the cargo trailer 240 can comprise a standard box trailer for common eighteen-wheeler trucks. However, the cargo trailer 240 can also comprise any type of trailer that couples to the fifth wheel or trailer hitch of a tractor 230, and can carry any type of cargo. For example, the cargo trailer 240 can comprise a car-carrier trailer, a flatbed trailer, a tanker trailer, a dump trailer, a hopper bottom trailer, a lowboy trailer, a refrigeration trailer, a tank container chassis trailer, or a double trailer.

According to examples provided herein, the cargo trailer 240 can include a Mansfield bar 244 having an intermediate mounting component 246 coupled thereto. As described herein, the intermediate mounting component 246 can include a first set of securing elements to secure the intermediate mounting component 246 to the Mansfield bar 244, and a second set of securing elements upon which a number of sensors can be securely mounted. In certain implementations, the intermediate mounting component 246 can comprise a single component that includes one or more sensors. In variations, the intermediate mounting component 246 can comprise multiple separate components (e.g., a pair of mounting components mounted to each end of the Mansfield bar 244).

In some aspects, the intermediate mounting component 246 can extend substantially the entire length of the Mansfield bar 244 (e.g., ~90% of the full length of the Mansfield bar 244). In variations, the intermediate mounting component 246 can extend partially across a center portion of the Mansfield bar 244 (e.g., covering ~50% of the length of the Mansfield bar 244). The intermediate mounting component 246 can include any number of sensors, and can include any type of sensor (e.g., radar sensors, LIDAR sensors, and cameras) in various sensor configurations.

It is contemplated that radar data can be specifically beneficial for the autonomous control system of the truck 200 due to its advantageous nature in detecting velocity differentials. Accordingly, in the example shown, the intermediate mounting component 246 includes a pair of radar sensors 252, 254 mounted to opposing ends of the intermediate mounting component 246 to provide radar data coverage over the entire region 118 shown in FIG. 1. In certain examples, the intermediate mounting component 246 can further include one or more cameras 256 and/or one or more LIDAR sensors 258 (e.g., an LD LIDAR sensor) to provide redundant or supplementary sensor data corresponding to region 118 (e.g., for object classification and tracking).

Example Systems

Figure 3:
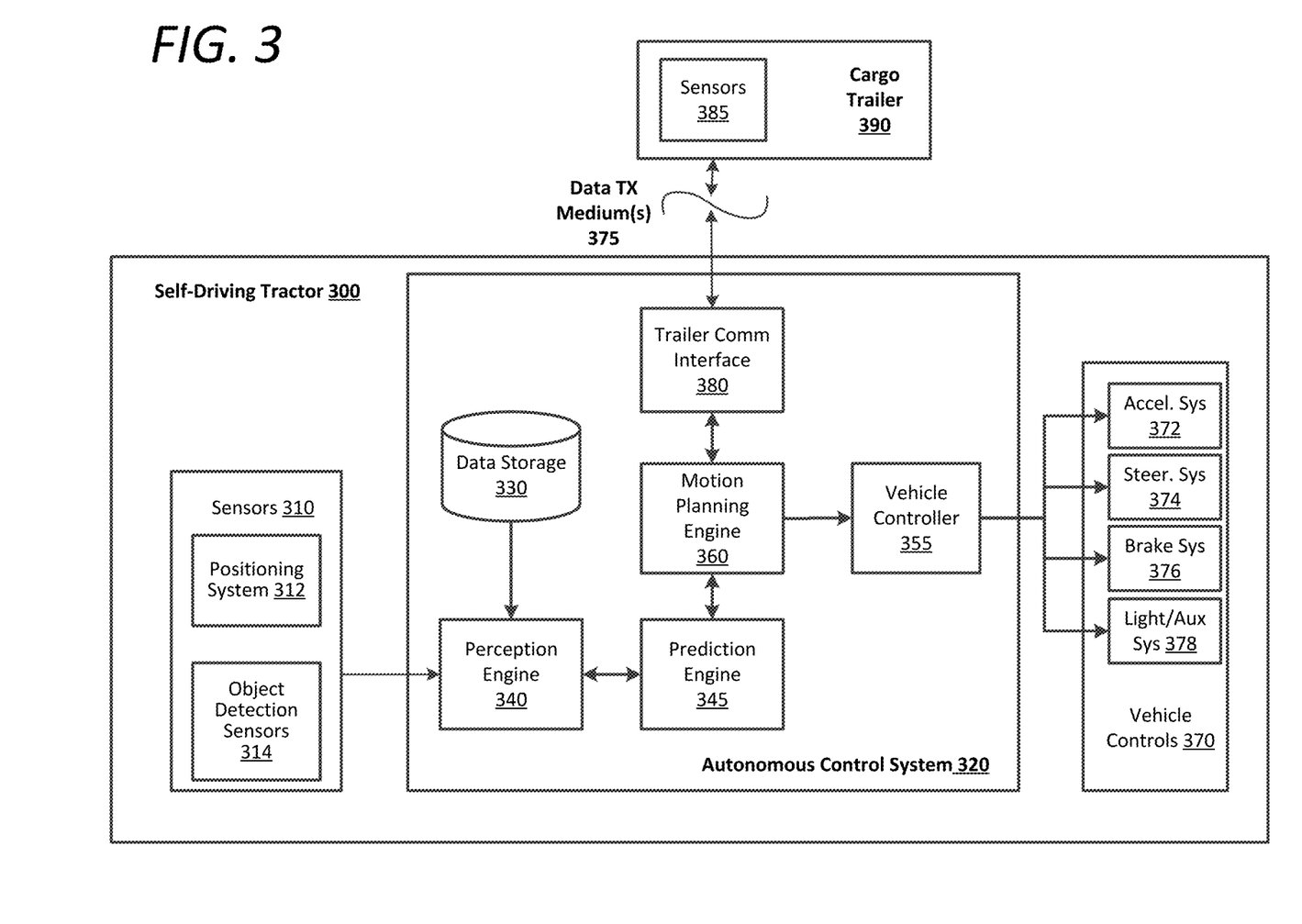
FIG. 3 is a block diagram illustrating a vehicle control system of a self-driving tractor in communication with sensors mounted to the Mansfield bar of a cargo trailer, according to various embodiments.

FIG. 3 is a block diagram illustrating a vehicle control system 320 of a self-driving tractor 300 in communication with sensors mounted to the Mansfield bar of a cargo trailer 390, according to various embodiments. In an example of FIG. 3, an autonomous control system 320 can autonomously operate the self-driving tractor 300 throughout geographic regions for a variety of purposes, including transport services (e.g., on-demand transport, freight and delivery services, etc.). In examples described, the self-driving tractor 300 can operate autonomously without human control. For example, the self-driving tractor 300 can autonomously steer, accelerate, shift, brake, and operate lighting components. Some variations also recognize that the self-driving tractor 300 can switch between an autonomous mode, in which the vehicle control system 320 autonomously operates the tractor 300, and a manual mode in which a qualified driver takes over manual control of the acceleration system 372, steering system 374, braking system 376, and lighting and auxiliary systems 378 (e.g., directional signals and headlights).

According to various examples, the vehicle control system 320 can utilize specific sensor resources 310 mounted to or otherwise included with the tractor 300 to autonomously operate the tractor 300 in a variety of driving environments and conditions. For example, the autonomous control system 320 can operate the tractor 300 by autonomously operating the steering, acceleration, and braking systems 372, 374, 376 of the tractor 300 to a specified destination. The control system 320 can perform low-level vehicle control actions (e.g., braking, steering, accelerating) and high-level route planning using sensor information, as well as other inputs (e.g., transmissions from remote or local human operators, network communication from other vehicles, a freight transport coordination system, etc.).

In an example of FIG. 3, the autonomous control system 320 includes computational resources (e.g., processing cores and/or field programmable gate arrays (FPGAs)) which operate to process sensor data received from the sensors 310 of the tractor 300, which provide a sensor view of a road segment upon which the tractor 300 operates. The sensor data can be processed to determine actions to be performed by the tractor 300 in order for the tractor 300 to continue on a route to the destination, or in accordance with a set of transport instructions received from a remote freight transport coordination service. In some variations, the vehicle control system 320 can include other functionality, such as wireless communication capabilities using a communications module, to send and/or receive wireless communications over one or more networks with one or more remote sources. In controlling the tractor 300, the control system 320 can generate commands to operate the various vehicle control mechanisms 370 of the tractor 300, including the acceleration system 372, steering system 374, braking system 376, and auxiliary systems 378 (e.g., lights and directional signals).

The self-driving tractor 300 can be equipped with multiple types of sensors 310 which can combine to provide a computerized perception, or live sensor view, of the space and the physical environment surrounding the tractor 300. Likewise, the control system 320 can operate within the tractor 300 to receive sensor data from the sensors 310 and to control the various vehicle controls 370 in order to autonomously operate the tractor 300. For example, the control system 320 can analyze the sensor data to generate low level commands executable by the acceleration system 372, steering system 374, and braking system 376 of the tractor 300. Execution of the commands by the control mechanisms 370 can result in throttle inputs, braking inputs, and steering inputs that collectively cause the tractor 300 to operate along sequential road segments according to a route plan.

In more detail, the sensors 310 operate to collectively obtain a live sensor view for the vehicle control system 320 (e.g., in a forward operational direction, or providing a 360-degree sensor view), and to further obtain situational information proximate to the tractor 300, including any potential hazards or obstacles. By way of example, the sensors 310 can include a positioning system 312, such as a GPS module, and object detection sensors 314. The object detection sensors 314 can be arranged in a sensor suite or sensor arrays mounted to the exterior of the tractor 300, such as on the front bumper and roof as shown in FIG. 2A. The object detection sensors 314 can comprise multiple sets of cameras (video cameras, stereoscopic cameras or depth perception cameras, long range monocular cameras), LIDAR sensors, one or more radar sensors, and various other sensor resources such as sonar, proximity sensors, infrared sensors, and the like.

In general, the sensors 310 collectively provide sensor data to a perception engine 340 of the vehicle control system 320. The perception engine 340 can access a data storage 330 comprising localization sub-maps of the given region in which the tractor 300 operates. The localization sub-maps can comprise a series of road segment sub-maps that enable the perception engine 340 to perform dynamic comparisons with the live sensor view to perform object detection and classification operations. As provided herein, the localization sub-maps can comprise highly detailed ground truth data of each road segment on which the self-driving tractor 300 can travel. For example, the localization sub-maps can encompass long stretches of highways where perception operations are relatively undemanding compared to a crowded urban environment.

The localization sub-maps can comprise prerecorded and fused data (e.g., sensor data including image data, LIDAR data, and the like) by specialized mapping vehicles and/or autonomous vehicles with recording sensors and equipment, and can be processed to pinpoint various objects of interest (e.g., traffic signals, road signs, and other static objects). As the control system 320 autonomously operates the tractor 300 along a given route, the perception engine 340 can access sequential localization sub-maps of current road segments to compare the details of a current localization sub-map with the sensor data in order to detect and classify any objects of interest, such as road debris, other vehicles, pedestrians, bicyclists, and the like.

In various examples, the perception engine 340 can dynamically compare the live sensor data from the tractor's sensors 310 to the current localization sub-map as the tractor 300 travels through a corresponding road or highway segment. The perception engine 340 can identify and classify any objects of interest in the live sensor data that can indicate a potential hazard. In accordance with many examples, the perception engine 340 can provide object of interest data to a prediction engine 345 of the control system 320, where the objects of interest can each be classified (e.g., a pedestrian, a bicyclist, unknown objects, other vehicles, a static object, etc.).

Based on the classification of the detected objects, the prediction engine 345 can predict a path of each object of interest and determine whether the vehicle control system 320 should respond or react accordingly. For example, the prediction engine 345 can dynamically calculate a collision probability for each object of interest based at least in part on its classification, and generate event alerts if the collision probability exceeds a certain threshold. As described herein, such event alerts can be processed by a motion planning engine 360 along with a processed sensor view indicating the classified objects within the live sensor view of the tractor 300. The vehicle controller 355 can then generate control commands executable by the various vehicle controls 370 of the tractor 300, such as the acceleration, steering, and braking systems 372, 374, 376. In certain examples, the motion planning engine 360 can determine an immediate, low level trajectory and/or higher-level plan for the tractor 300 based on the event alerts and processed sensor view (e.g., for the next 100 meters, up to a next intersection, or for a certain distance along a highway).

On a higher level, the motion planning engine 360 can provide the vehicle controller 355 with a route plan to a given destination, such as a pick-up location, a docking and drop off location, or other destination within a given road network. In various aspects, the motion planning engine 360 can generate the route plan based on transport instructions received from a remote freight coordination service (e.g., over a wireless network). On a lower level, the motion planning engine 360 can provide the vehicle controller 355 with an immediate trajectory for the tractor 300 based on the objects of interest, obstacles, and collision probabilities identified and determined by the perception and prediction engines 340, 345. The vehicle controller 355 can generate the appropriate control commands executable by the vehicle controls 370 accordingly.

In various examples, the motion planning engine 360 generates trajectories for the tractor 300 in accordance with a motion planning model. Execution of the motion planning model enables the motion planning engine 360 to safely calculate and/or construct trajectories in accordance with the configuration and capabilities of the cargo trailer 390, such as the maximum turning radius of the tractor 300 given the dimensions of the cargo trailer 390, the dimensions of the tractor 300 and cargo trailer 390 combination (e.g., its overall length, width, and height), and the axle positions of the tractor 300 and cargo trailer 390 (e.g., to determine how wide to take a particular turn to ensure adequate clearance from curbs and objects).

According to examples described herein, the vehicle control system 320 can include a trailer communication interface 380 to communicatively couple the self-driving tractor 300 to the various sensors 385 mounted to the Mansfield bar of the cargo trailer 390 over one or more data transmission medium(s) 375. Various operations of the control system 320 performed in connection with the sensors 385 of the cargo trailer 390 are described below with respect to the flow chart of FIG. 7. The data transmission medium(s) 375 can comprise a wireless medium, such as BLUETOOTH or Wi-Fi, in which communications modules of the sensor 385 can transmit sensor data to the trailer communication interface 380. In such examples, the trailer communication interface 380 can also include wireless communication capabilities to transmit and or receive the sensor data. In certain examples, the data transmission medium(s) 375 can include a wired communication bus and connector (e.g., a round pin connector). In such examples, the sensor 385 can transmit sensor data to the trailer communication interface 380 through the wired communication bus (e.g., via a dedicated data bus and connector pin).

The sensor data from the sensors 385 can be processed by the motion planning engine 360 to detect and monitor objects of interest that would otherwise be in a blind spot of the self-driving tractor 300 (e.g., region 118 of FIG. 1). For example, during maneuvers such as lane changes and freeway merging, sensor data from the sensors 385 of the cargo trailer 390 can indicate any oncoming vehicles behind the trailer 390. In some aspects, the sensor data from the sensor 385 can be processed by the perception engine 340 and the prediction engine 345 to perform object detection, classification, and dynamic path prediction and collision probability calculations, as described herein. Based on the sensor data received via the data transmission medium(s) 375, the motion planning engine 360 can generate control actions that cause the vehicle controller 355 to safely operate the vehicle controls 370 such that upcoming vehicles from the rear of the cargo trailer 390 are accounted for, and any potential collisions are avoided.

Mansfield Bar Sensor Assembly

Figure 4:
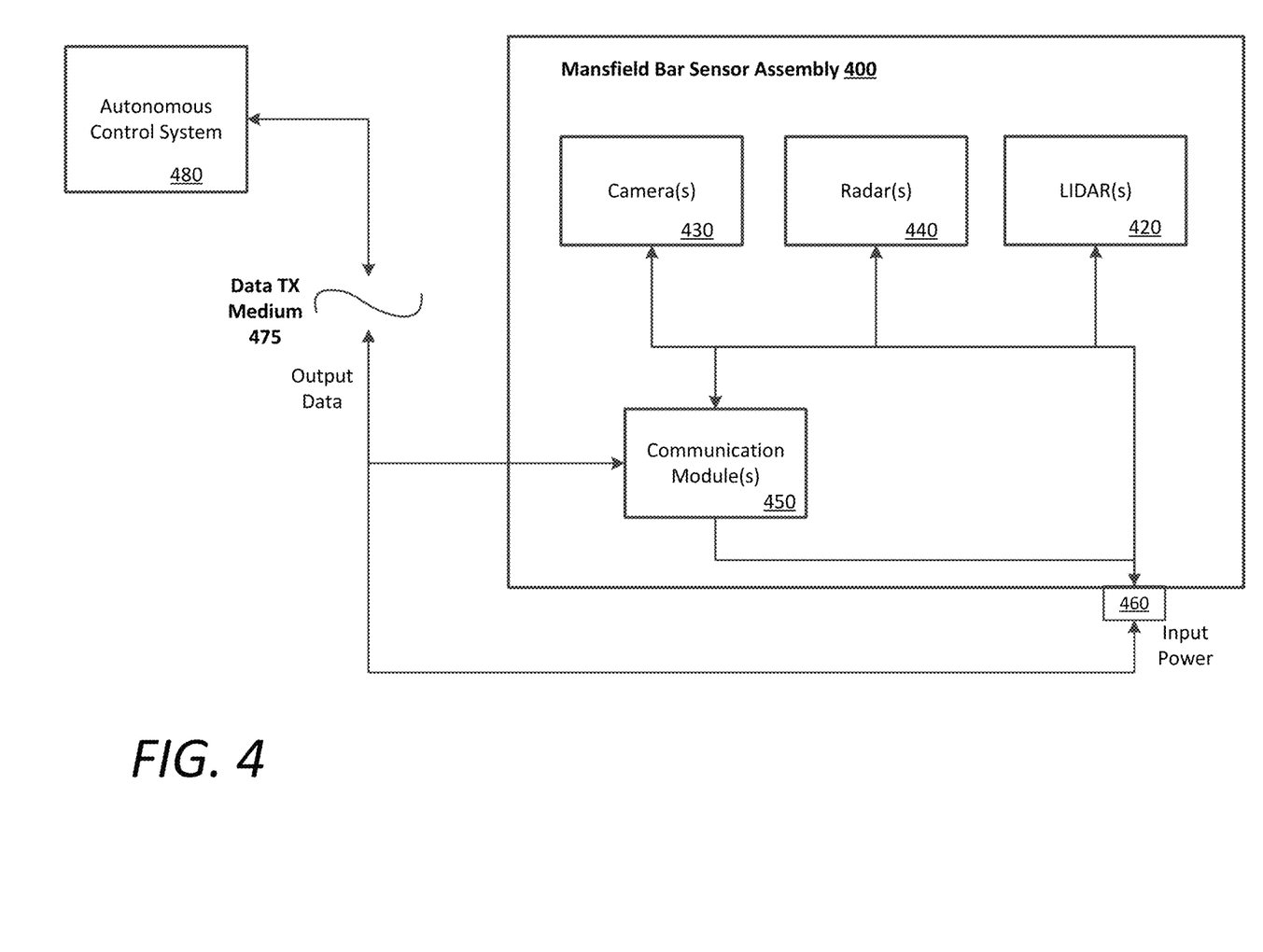
FIG. 4 is a block diagram of an example sensor configuration of a Mansfield bar sensor assembly, according to one or more embodiments.

FIG. 4 is a block diagram of an example sensor configuration of a Mansfield bar sensor assembly 400, according to one or more embodiments. The various sensors of the Mansfield bar sensor assembly 400 can be mounted to an intermediate mounting component 246, as shown and described with respect to FIG. 2B. Referring to FIG. 4, the Mansfield bar sensor assembly 400 can include a set of sensors. This set of sensors can comprise one or more cameras 430, radar sensors 440, and/or LIDAR sensors 420 that generate sensor data encompassing a field of view rearwards from a cargo trailer 240. In additional examples, the Mansfield bar sensor assembly 400 can include other sensor modalities, such as one or more ultrasonic sensors or time-of-flight cameras.

According to various examples, the Mansfield bar sensor assembly 400 can include a wired interface 460 to receive input power for the camera(s) 430, radar sensor(s) 440, and/or LIDAR sensor(s) 420 from the tractor 230 (e.g., from an alternator or battery system of the tractor 230. In one example, the wired interface 460 couples with existing wiring of the cargo trailer 240 to receive the input power. Additionally or alternatively, the wired interface 460 can also comprise a data transmission interface to transmit sensor data generated by the camera(s) 430, radar sensor(s) 440, and/or LIDAR sensor(s) 420 to the autonomous control system 480 of the self-driving tractor 230, as described herein. Accordingly, the data transmission medium 475 can comprise a wired bus connector between the cargo trailer 240 and the self-driving tractor 230 (e.g., round pin connector comprising seven or nine pins).

In variations, the Mansfield bar sensor assembly 400 can include one or more communication modules 450 that transmits the sensor data wirelessly to the autonomous control system 480 (e.g., via a BLUETOOTH connection). For example, each sensor of the Mansfield bar sensor assembly 400 can include a dedicated communication module 450, or the sensor data from all of the sensors can be transmitted in concert via a single communication module 450.

Intermediate Mounting Component

Figure 5:
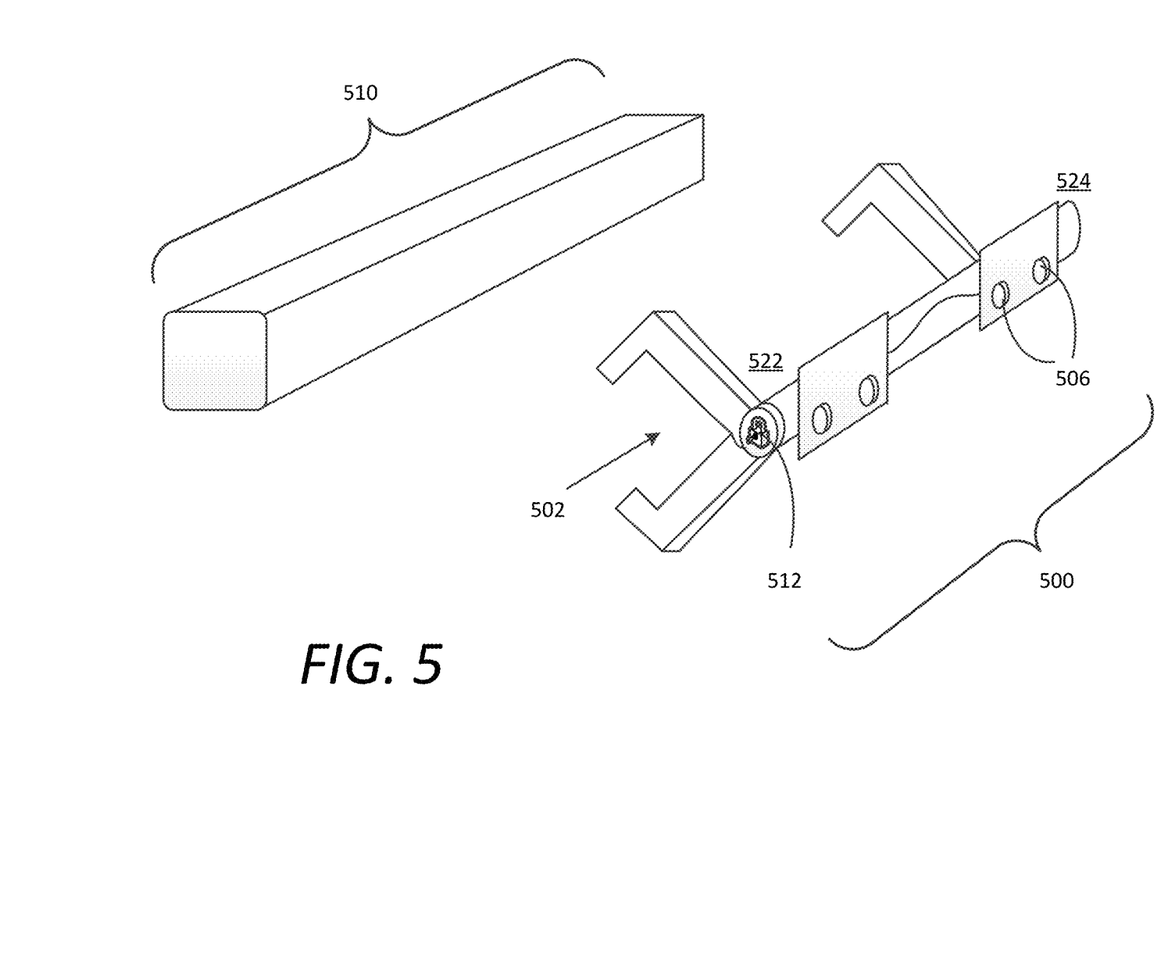
FIG. 5 illustrates an intermediate mounting component couplable to a Mansfield bar of a cargo trailer, according to one or more embodiments.

FIG. 5 illustrates an intermediate mounting component 500 couplable to a Mansfield bar of a cargo trailer, according to one or more embodiments. The intermediate mounting component 500 shown in FIG. 5 can correspond to the intermediate mounting component 246 shown and described with respect to FIG. 2B, and can include the Mansfield bar sensor assembly 400 as shown and described with respect to FIG. 4. As described herein, the intermediate mounting component 500 can include a dimensional length that is substantially the length of the Mansfield bar 510.

Referring to FIG. 5, the intermediate mounting component 500 can include a first set of securing components 502 configured to couple the intermediate mounting component 500 with the Mansfield bar 510 of a cargo trailer 240. In certain implementations, the first set of securing components 502 can comprise an adjustable mounting bracket or clamp that enables a person to readily secure the intermediate mounting component to the Mansfield bar 510. For example, the first set of securing elements 502 can include an adjustable hinged clamp with a securing lock 512. In variations, the first set of securing elements 502 can comprise other forms of mounting or coupling mechanisms, such as magnetic elements, adhesives, cinching ties, and the like.

According to various examples, the intermediate mounting component 500 can further include a second set of securing elements 506 that secures the Mansfield bar sensor assembly 400 to the intermediate mounting component 500. The second set of securing elements 506 can also comprise any suitable mounting or securing features, such as tightening screws or bolts, clamps, welds, clips, and the like. In certain implementations, the second set of securing elements 506 can be customized to secure specific types of sensors, and/or sensors manufactured by a specific manufacturer to the intermediate mounting component 500.

As described herein, the intermediate mounting component 500 can include sensor mounted thereto in a specified arrangement for the detection of upcoming vehicles from the rear of the cargo trailer 240. For example, a pair of radar sensors may be mounted to opposing ends 522, 524 of the intermediate mounting component to generate radar data encompassing the full rearward region 118 of the cargo trailer 240. Additionally or alternatively, one or more cameras and/or one or more LIDAR sensors may be mounted centrally to the intermediate mounting component 500. However, examples described herein are not limited any particular sensor arrangement on the intermediate mounting component 500. Rather, any arrangement may be configured on the intermediate mounting component 500 shown and described in connection with FIG. 5.

Dynamic Coordinate Transform

Figure 6A:
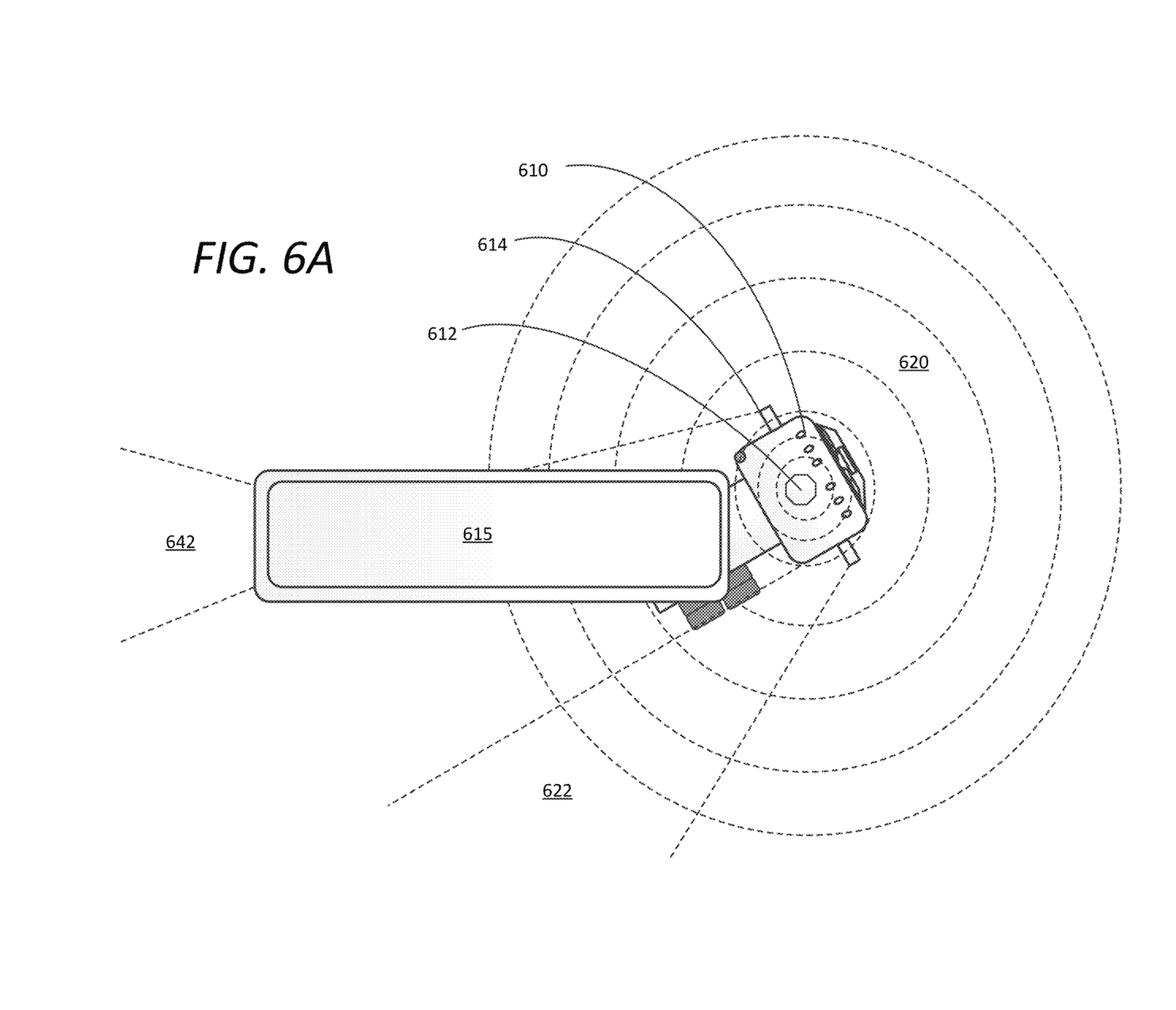
FIGS. 6A and 6B illustrate the respective fields of view and reference frames of the tractor and trailer, according to one or more embodiments.
Figure 6B:
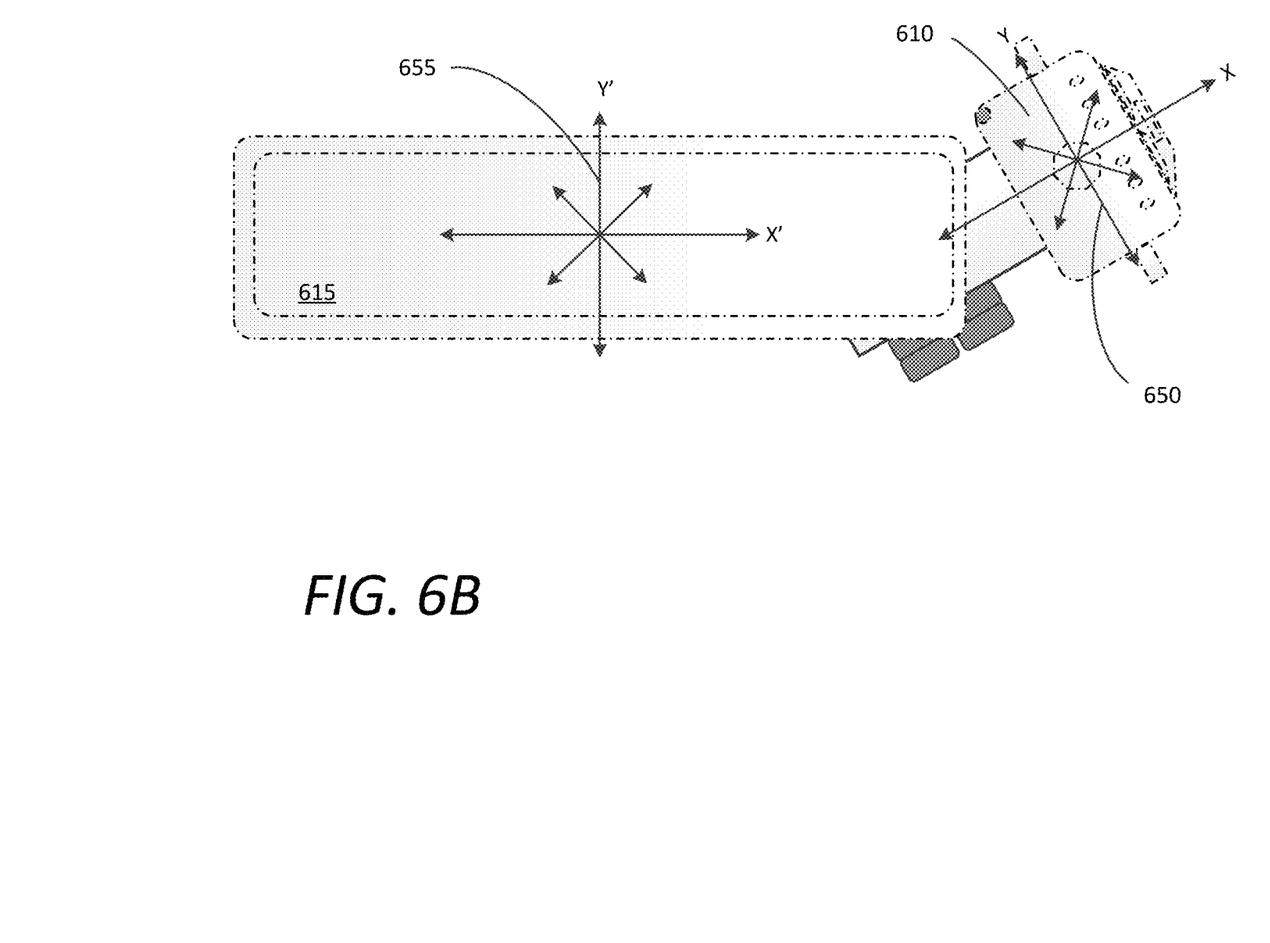

FIGS. 6A and 6B illustrate the respective fields of view and reference frames of the tractor and trailer, according to one or more embodiments. Referring to FIG. 6A a self-driving tractor 610 can include a cargo trailer 615 having a kingpin secured to the fifth wheel of the tractor 610. To generate a fused sensor view of the surrounding environment of the self-driving tractor 610, the control system 320 of the tractor 610 executes coordinate transformations to account for the different locations of the sensors mounted to the tractor 610. For example, the primary rooftop LIDAR sensor 612 can be centrally located on the roof of the tractor 610, whereas rearward facing sensor assemblies 614 may be mounted to the sides of the tractor 610. However, the sensor assemblies 614, the LIDAR sensor 612, and any cameras and radar sensors affixed to the tractor 610 share the same coordinate system inherent to the tractor 610. In other words, the executing transforms can be static since the relative placement of each sensor on the tractor 610 remains constant with respect to other sensors affixed to the tractor 610.

As an example, to fuse the sensor data, the control system 320 of the tractor 610 can execute coordinate transforms on sensor data from the sensor assemblies 614 that encompass the rearward fields of view 622 to match the local coordinates of the primary LIDAR sensor 612. As such, the sensor data from the sensor assemblies 612 can be fused with the point cloud map 620 from the LIDAR sensor 612 to provide complete sensor view surrounding the tractor 610—minus the blocked rearward field of view 642 resultant from the coupled trailer 615. As described herein, the blocked rearward field of view 642 can be covered by sensor data from a Mansfield bar sensor assembly 400 coupled to an intermediate mounting component 500 mounted to the Mansfield bar 510 of the trailer 615. However, the local coordinates of the Mansfield bar or trailer 615 can be different dynamically with respect to the local coordinate system of the tractor 610. Accordingly, the coordinate transformation required for sensor data encompassing field of view 642 requires the autonomous control system 320 of the tractor 610 to dynamically determine the relative orientations of the trailer 615 and the tractor 610.

Referring to FIG. 6B, the tractor 610 comprises local coordinate system 650 whereas the trailer 615 comprises local coordinate system 655. Due to the pivoting of the kingpin within the fifth wheel of the tractor 610, the local coordinate system 650 of the tractor 610 will dynamically change in relation to the local coordinate system 655 of the trailer 615, particularly when performing steering maneuvers, as shown. In order to generate a fused sensor view of the surrounding environment of the self-driving tractor 610 and trailer 615, the autonomous control system 320 of the tractor 610 can dynamically determine a coordinate transform between the tractor 610 and the trailer 615. In particular, the autonomous control system 320 can receive sensor data indicating the relative orientation of the trailer 615 in relation to the tractor 610.

As provided herein, the term "dynamically" means a continuous or near-continuous implementation of a stated action. For example, as the tractor 610 operates and executes turns, the orientations of the tractor 610 and trailer 615 change dynamically, and therefore, the coordinate transform between the tractor 610 and trailer 615 also changes dynamically in order to generate a consistent, fused sensor view of the surrounding environment of the truck. This is distinct from a static, non-changing coordinate transform between sensors on differing positions of an object (e.g., a rooftop sensor versus a front bumper sensor on an autonomous vehicle).

For example, the autonomous control system 320 can process image data from one or more rearward facing cameras mounted to the tractor 610 to determine a trailer angle of the trailer 615. In one aspect, the rearward facing cameras can comprise a left camera and a right camera, each having a field of view that detects a leading edge or corner of the trailer 615. Based on the relative distances to the corners or edges of the trailer 615, the control system 320 can determine the orientations of the trailer 615, and generate the coordinate transform accordingly. In variations, the control system 320 can receive sensor data from one or more stators or encoders coupled to an inner surface of the fifth wheel to detect the rotation of the kingpin directly. Based on the detected rotation of the kingpin, the control system 320 can determine the orientation of the trailer 615 in relation to the tractor 610 and dynamically generate the coordinate transform accordingly. In further variations, the controller system 320 can receive sensor data from other trailer-mounted sensors (e.g., a GPS system, an IMU, camera, LIDAR sensor, radar, etc.) to determine the orientation of the trailer.

In determining the orientation of the trailer and the coordinate transform, the control system 320 can execute a number of state estimation techniques or algorithms based on the received sensor data from the trailer. For example, the control system 320 can utilize a Kalman filter (e.g., a EKF and/or UKF) to predict and update the state or orientation of the trailer 615, and/or the location of various points of the trailer (e.g., the rear corners and/or axle locations) in real time. Based on the real-time state estimations and the observations of the orientation of the trailer 615, the control system 320 can determine the coordination transform between the trailer 615 and the tractor 610.

Based on the dynamically generated coordinate transform, the autonomous control system 320 can execute the transform on sensor data from the rear Mansfield bar sensor assembly 400 to generate a live, fused sensor view of the surrounding environment of the truck, including the rear field of view 642 behind the trailer 615. In doing so, the autonomous control system 320 can perceive and anticipate the actions of approaching vehicles from the rear prior when performing lane changes, merging, exiting, docking, braking, and other turning maneuvers.

Methodology

Figure 7:
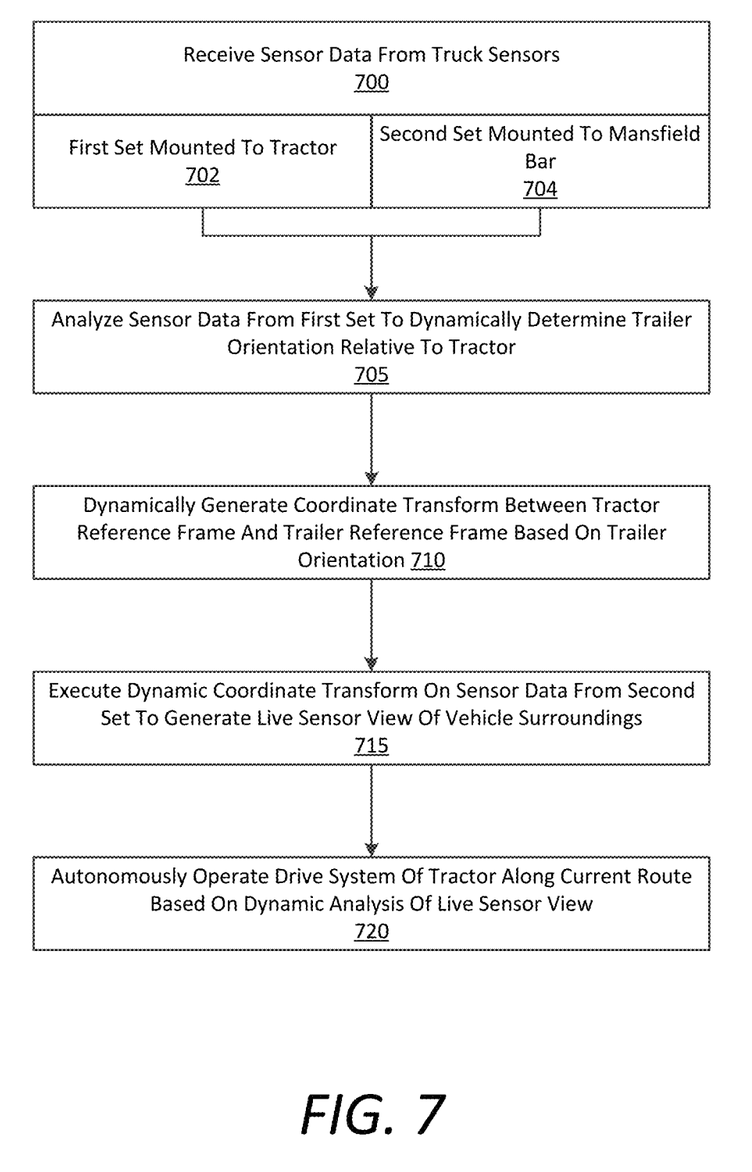
FIG. 7 is a flow chart describing an example method of generating a dynamic coordinate transform between reference frames of the tractor and trailer respectively.

FIG. 7 is a flow chart describing an example method of generating a dynamic coordinate transform between reference frames of the tractor and trailer respectively. In the below discussion of FIG. 7, reference may be made to reference characters representing like features as shown and described with respect to FIGS. 1 through 6B. Furthermore, the processes described in connection with FIG. 7 may be performed by an autonomous control system 320 of a self-driving tractor 300 as shown and described with respect to FIG. 3, and throughout the present disclosure. Referring to FIG. 7, the control system 320 can receive sensor data from various sensors mounted to the self-driving semi-truck 200 (700). As described herein, the control system 320 can receive sensor a first set of sensors mounted to the tractor 230 (702), and a second set of sensors mounted to the Mansfield bar 244 of the trailer 240 (704).

According to various examples, the autonomous control system 320 can analyze sensor data from the first set of sensors to dynamically determine the trailer orientation relative to the tractor 230 (705). For example, the control system 320 can monitor image data from one or more rearward facing cameras mounted to the tractor 230, and/or encoder data from a kingpin encoder coupled within the fifth wheel of the tractor 230 to determine a relative angle of the trailer 240 in relation to a forward operational direction of the tractor 230. In certain implementations, the trailer length and other dimensions (e.g., the location of the Mansfield bar 244 in relation to the fifth wheel) can be known or inputted to the control system 320. Based on the orientation of the trailer 240 and the fixed location of the Mansfield bar 244 in relation to the fifth wheel, the control system 320 can dynamically generate a coordinate transform between the reference frame or local coordinate system 350 of the tractor 230 and the reference frame or local coordinate system 655 of the trailer 240 (710).

According to certain examples, the control system 320 may execute the dynamic coordinate transform on sensor data from the second set of sensors mounted to the Mansfield bar 244 to generate a live, fused sensor view of a surrounding environment of the self-driving semi-truck 100 (715). Based on the live, fused sensor view of the surrounding environment, the autonomous control system 320 can autonomously operate the drive system (e.g., acceleration, braking, and steering systems) of the tractor 230 along a current route (720).

Example Hardware Diagram

Figure 8:
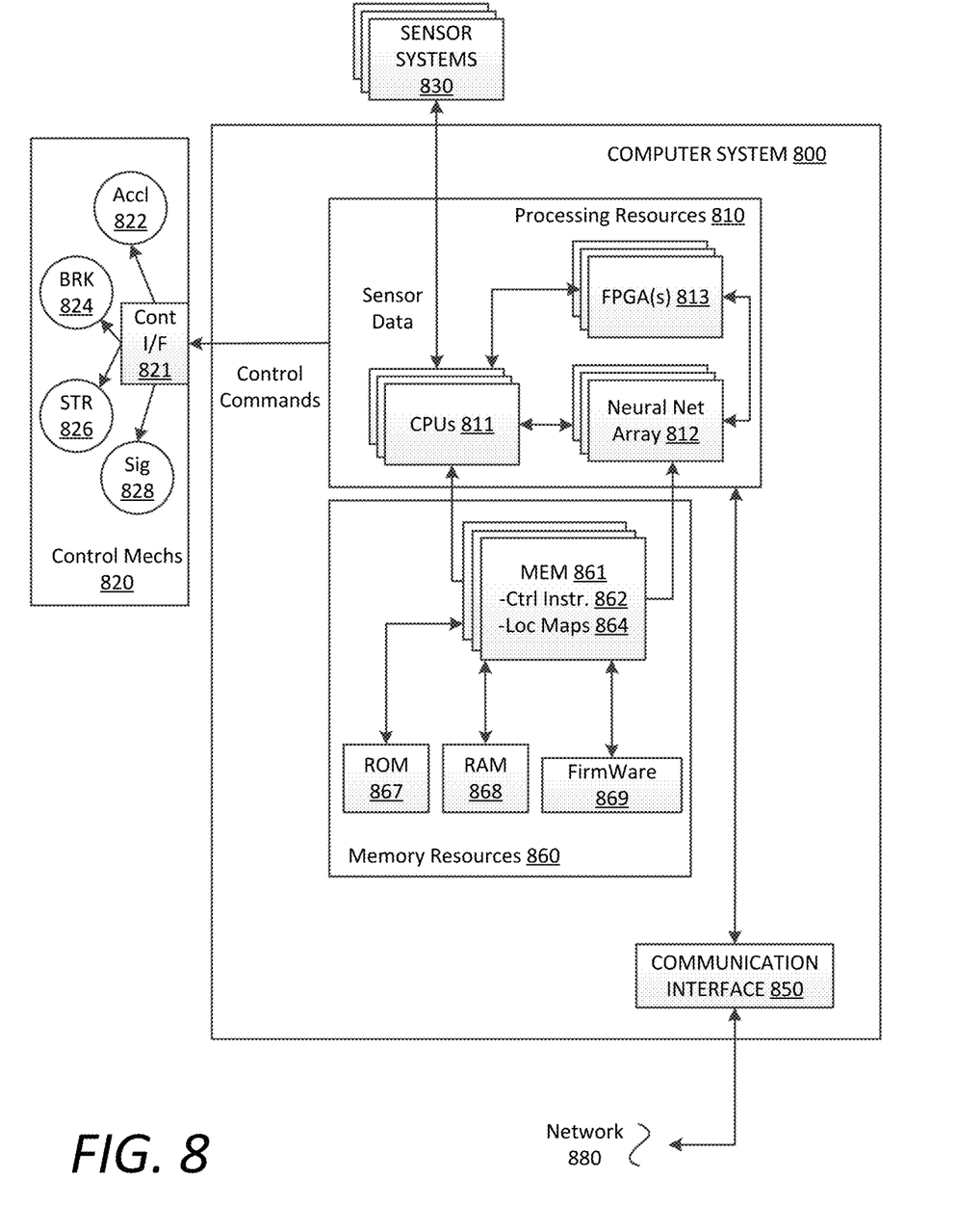
FIG. 8 is a block diagram illustrating a computer system upon which example processing systems of a self-driving tractor unit described herein may be implemented.

FIG. 8 is a block diagram illustrating a computer system upon which example processing systems of a self-driving tractor described herein may be implemented. The computer system 800 can be implemented using a number of processing resources 810, which can comprise computer processing (CPUs) 811 and field programmable gate arrays (FPGAs) 813. In some aspects, any number of processors 811 and/or FPGAs 813 of the computer system 800 can be utilized as components of a neural network array 812 implementing a machine learning model and utilizing road network maps stored in memory 861 of the computer system 800. In the context of FIG. 3, various aspects and components of the control system 320 can be implemented using one or more components of the computer system 800 shown in FIG. 8.

According to some examples, the computer system 800 may be implemented within a self-driving tractor with software and hardware resources such as described with examples of FIG. 3. In an example shown, the computer system 800 can be distributed spatially into various regions of the self-driving tractor, with various aspects integrated with other components of the tractor itself. For example, the processing resources 810 and/or memory resources 860 can be provided in a cargo space of the self-driving tractor. The various processing resources 810 of the computer system 800 can also execute control instructions 862 using microprocessors 811, FPGAs 813, a neural network array 812, or any combination of the foregoing.

In an example of FIG. 8, the computer system 800 can include a communication interface 850 that can enable communications over a network 880. In one implementation, the communication interface 850 can also provide a data bus or other local links to electro-mechanical interfaces of the vehicle, such as wireless or wired links to and from control mechanisms 820 (e.g., via a control interface 821), sensor systems 830, and can further provide a network link to a backend transport management system or a remote teleassistance system (implemented on one or more datacenters) over one or more networks 880.

The memory resources 860 can include, for example, main memory 861, a read-only memory (ROM) 867, storage device, and cache resources. The main memory 861 of memory resources 860 can include random access memory (RAM) 868 or other dynamic storage device, for storing information and instructions which are executable by the processing resources 810 of the computer system 800. The processing resources 810 can execute instructions for processing information stored with the main memory 861 of the memory resources 860. The main memory 861 can also store temporary variables or other intermediate information which can be used during execution of instructions by the processing resources 810. The memory resources 860 can also include ROM 867 or other static storage device for storing static information and instructions for the processing resources 810. The memory resources 860 can also include other forms of memory devices and components, such as a magnetic disk or optical disk, for purpose of storing information and instructions for use by the processing resources 810. The computer system 800 can further be implemented using any combination of volatile and/or non-volatile memory, such as flash memory, PROM, EPROM, EEPROM (e.g., storing firmware 869), DRAM, cache resources, hard disk drives, and/or solid state drives.

The memory 861 may also store localization maps 864 in which the processing resources 810—executing control instructions 862—continuously compare to sensor data from the various sensor systems 830 of the self-driving tractor. Execution of the control instructions 862 can cause the processing resources 810 to generate control commands in order to autonomously operate the tractor's acceleration 822, braking 824, steering 826, and signaling systems 828 (collectively, the control mechanisms 820). Thus, in executing the control instructions 862, the processing resources 810 can receive sensor data from the sensor systems 830, dynamically compare the sensor data to a current localization map 864, and generate control commands for operative control over the acceleration, steering, and braking of the AV along a particular route plan. The processing resources 810 may then transmit the control commands to one or more control interfaces 821 of the control mechanisms 820 to autonomously operate the self-driving tractor along an autonomy route.

While examples of FIG. 8 provide for computing systems for implementing aspects described, some or all of the functionality described with respect to one computing system of FIG. 8 may be performed by other computing systems described with respect to FIG. 8.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming.

What is claimed is:

1. A self-driving semi-truck comprising:
   a tractor comprising a drive system;
   a first set of sensors mounted to the tractor;
   a cargo trailer comprising coupled to the tractor
   a second set of sensors mounted to the cargo trailer; and
   an autonomous control system comprising processing resources executing in instruction set, causing the autonomous control system to:
     monitor a dynamic orientation of the cargo trailer in relation to the tractor;
     based on the dynamic orientation of the cargo trailer, dynamically generate a coordinate transform between a first reference frame of the first set of sensors mounted to the tractor and a second reference frame of the second set of sensors mounted to the cargo trailer; and
     execute the dynamically generated coordinate transform on sensor data from the second set of sensors to generate a fused sensor view of a surrounding environment of the self-driving semi-truck, wherein executing the dynamically generated coordinate transform on the sensor data from the second set of sensors comprises processing the sensor data from the second set of sensors to match local coordinates of at least one of the first set of sensors.

2. The self-driving semi-truck of claim 1, wherein the executed instruction set further causes the autonomous control system to:
   analyze the fused sensor view to autonomously operate the drive system along a current route.

3. The self-driving semi-truck of claim 1, further comprising:
   an intermediate mounting component coupling the second set of sensors to the cargo trailer.

4. The self-driving semi-truck of claim 3, wherein the intermediate mounting component comprises a first set of securing elements coupling the intermediate mounting component to a Mansfield bar of the cargo trailer, and a second set of securing elements to secure the second set of sensors to the intermediate mounting component.

5. The self-driving semi-truck of claim 1, wherein the executed instruction set further causes the autonomous control system to:
   receive the sensor data from the second set of sensors via a bus connector that electrically couples the cargo trailer to the tractor.

6. The self-driving semi-truck of claim 1, wherein the first set of sensors comprises a set of one or more LIDAR sensors, one or more cameras, and one or more radar sensors.

7. The self-driving semi-truck of claim 1, wherein the first set of sensors comprises a pair of rearward facing sensor assemblies mounted to door mirrors of the tractor.

8. The self-driving semi-truck of claim 1, wherein the second set of sensors comprises at least one radar sensor.

9. The self-driving semi-truck of claim 8, wherein the second set of sensors further comprises at least one camera.

10. The self-driving semi-truck of claim 1, wherein the executed instruction set causes the autonomous control system to monitor the dynamic orientation of the trailer by receiving image data from one or more rearward facing cameras mounted to the tractor, and determining a trailer angle based on respective distances to leading edges of the cargo trailer.

11. The self-driving semi-truck of claim 1, wherein the executed instruction set causes the autonomous control system to monitor the dynamic orientation of the trailer by receiving encoder data that detects a rotation of a kingpin of the cargo trailer within a fifth wheel of the tractor, and determining a trailer angle based on the rotation of the kingpin.

12. An autonomous control system for a self-driving semi-truck, comprising:
   one or more processing resources; and
   a memory storing an instruction set that, when executed by the one or more processing resources, causes the one or more processing resources to:
     monitor a dynamic orientation of a cargo trailer in relation to a tractor of the semi-trailer truck;
     based on the dynamic orientation of the cargo trailer, dynamically generate a coordinate transform between a first reference frame of a first set of sensors mounted to the tractor, and a second reference frame of a second set of sensors mounted to the cargo trailer; and
     execute the dynamically generated coordinate transform on sensor data from the second set of sensors to generate a fused sensor view of a surrounding environment of the self-driving semi-truck, wherein executing the dynamically generated coordinate transform on the sensor data from the second set of sensors comprises processing the sensor data from the second set of sensors to match local coordinates of at least one of the first set of sensors.

13. The autonomous control system of claim 12, wherein the executed instruction set further causes the autonomous control system to:
   analyze the fused sensor view to autonomously operate a drive system of the self-driving semi-truck along a current route.

14. The autonomous control system of claim 12, wherein the self-driving semi-truck comprises an intermediate mounting component coupling the second set of sensors to the cargo trailer.

15. The autonomous control system of claim 14, wherein the intermediate mounting component comprises a first set of securing elements coupling the intermediate mounting component to a Mansfield bar of the cargo trailer, and a second set of securing elements to secure the second set of sensors to the intermediate mounting component.

16. The autonomous control system of claim 12, wherein the executed instruction set further causes the autonomous control system to:

receive the sensor data from the second set of sensors via a bus connector that electrically couples the cargo trailer to the tractor.

17. The autonomous control system of claim 12, wherein the first set of sensors comprises a set of one or more LIDAR sensors, one or more cameras, and one or more radar sensors.

18. The autonomous control system of claim 12, wherein the first set of sensors comprises a pair of rearward facing sensor assemblies mounted to door mirrors of the tractor.

19. The autonomous control system of claim 12, wherein the second set of sensors comprises at least one radar sensor.

20. A non-transitory computer readable medium storing instructions that, when executed by one or more processors of a self-driving semi-truck, cause the one or more processors to:
  monitor a dynamic orientation of a cargo trailer in relation to a tractor of the semi-trailer truck;
  based on the dynamic orientation of the cargo trailer, dynamically generate a coordinate transform between a first reference frame of a first set of sensors mounted to the tractor, and a second reference frame of a second set of sensors mounted to the cargo trailer; and
  execute the dynamically generated coordinate transform on sensor data from the second set of sensors to generate a fused sensor view of a surrounding environment of the self-driving semi-truck, wherein executing the dynamically generated coordinate transform on the sensor data from the second set of sensors comprises processing the sensor data from the second set of sensors to match local coordinates of at least one of the first set of sensors.

\* \* \* \* \*